(12) United States Patent
Cook

(10) Patent No.: US 6,916,760 B2
(45) Date of Patent: *Jul. 12, 2005

(54) SPRAY-DRYING CATALYST COMPOSITIONS AND METHODS OF SPRAY-DRYING

(75) Inventor: Jessica A. Cook, Clinton, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 163 days.

This patent is subject to a terminal disclaimer.

(21) Appl. No.: 10/362,204

(22) PCT Filed: Sep. 10, 2001

(86) PCT No.: PCT/US01/28371

§ 371 (c)(1),
(2), (4) Date: Feb. 21, 2003

(87) PCT Pub. No.: WO02/24331

PCT Pub. Date: Mar. 28, 2002

(65) Prior Publication Data

US 2003/0224929 A1 Dec. 4, 2003

Related U.S. Application Data

(63) Continuation-in-part of application No. 09/668,227, filed on Sep. 22, 2000, now Pat. No. 6,458,738.

(51) Int. Cl.$^7$ .............................................. B01J 31/00
(52) U.S. Cl. ...................... 502/150; 526/161; 556/27; 556/32; 556/51; 556/57; 556/136; 556/138; 502/103; 502/117
(58) Field of Search ...................... 526/161; 502/150, 502/103, 117; 556/27, 32, 51, 57, 136, 138

(56) References Cited

U.S. PATENT DOCUMENTS

| | | | | | |
|---|---|---|---|---|---|
| 5,672,669 | A | * | 9/1997 | Wasserman et al. | 526/170 |
| 6,001,478 | A | * | 12/1999 | Apecetche et al. | 428/407 |
| 6,096,676 | A | * | 8/2000 | Murray | 502/117 |
| 6,320,005 | B1 | * | 11/2001 | Murray | 526/161 |
| 6,458,738 | B1 | * | 10/2002 | Cook | 502/118 |
| 6,511,934 | B1 | * | 1/2003 | Cook et al. | 502/104 |
| 6,544,919 | B1 | * | 4/2003 | Tagge et al. | 502/113 |
| 6,670,297 | B1 | * | 12/2003 | Brookhart et al. | 502/103 |

* cited by examiner

Primary Examiner—Mark L. Bell
Assistant Examiner—Jennine Brown

(57) ABSTRACT

A spray drying process for preparing a solid catalyst and composition for use therein comprising a catalyst compound, an activator for the catalyst compound, and at least one compound selected from among siloxanes, polyalkylene glycols, $C_{1-4}$ alkyl or phenyl ether or diether derivatives of polyalkylene glycols, and crown ethers, and optionally a filler or support.

9 Claims, 3 Drawing Sheets

SPRAY-DRYING CATALYST COMPOSITIONS AND METHODS OF SPRAY-DRYING

This application is a 371 of PCT/US01/28371 filed Sep. 10, 2001, which is a CIP of Ser. No. 09/668,227, filed Sep. 22, 2000, now U.S. Pat. No. 6,458,738.

The invention relates to a family of novel compositions which exhibit excellent properties when spray-dried, as well as novel methods of spray-drying compositions. In particular, the invention provides methods for spray-drying catalyst compounds, in which the resulting spray-dried catalyst materials exhibit properties which are desirable for use in catalysis, as well as compositions used in such spray-drying methods.

Spray-drying techniques have been applied to catalyst compositions, for example, as an alternative to impregnating the catalyst on a support. For example, U.S. Pat. No. 5,290,745 discloses preparing a solution of titanium trichloride and magnesium dichloride in an electron donor compound (for example, tetrahydrofuran), admixing the solution with a filler, heating the resulting slurry to a temperature as high as the boiling point of the electron donor compound; atomizing the slurry by means of a suitable atomizing device to form droplets, and drying the droplets to form discrete solid, catalyst particles.

However, it has been found that it is very difficult to closely control morphology of the product obtained by spray-drying catalyst compositions such as the foregoing. In addition, it has been found that it is very difficult to consistently obtain spray-dried catalyst particles which have a high degree of uniformity as to size and sphericity. These problems have been particularly troublesome with regard to spray-drying catalyst compositions comprising single-site catalysts together with alumoxane activators and optionally a support.

Accordingly, there is an ongoing need for methods of spray-drying catalyst compositions which result in products having good integrity and morphology, and in particular, a high degree of uniformity with respect to sphericity and particle size. In particular, there is a need for such methods of spray-drying catalyst compositions, wherein the catalyst composition comprises a catalyst compound, a catalyst activator, and a filler or support. The compositions and spray-drying methods of the present invention satisfy these needs.

The present invention provides catalyst compositions useful for forming solid spray-dried catalysts and methods of spray-drying such compositions. According to the present invention, the catalyst compositions comprise, a catalyst compound, an activator for the catalyst compound, optionally, a filler or support, and one or more diluent compounds selected from the group consisting of siloxanes, polyalkylene glycols, $C_{1-4}$ alkyl or phenyl ether or diether derivatives of polyalkylene glycols, and crown ethers.

In accordance with the present invention, the inclusion of one or more diluent compounds selected from the group consisting of siloxanes, polyalkylene glycols, $C_{1-4}$ alkyl or phenyl ether or diether derivatives of polyalkylene glycols, and crown ethers in the catalyst compositions of the present invention results in spray-dried products which exhibit high degrees of uniformity of particle size and sphericity. The resulting spray-dried catalyst compositions possess extremely useful morphology and excellent activity.

The invention further provides a process for producing an olefin polymer, which comprises contacting at least one olefin monomer under polymerization conditions with a spray-dried catalyst composition as described above.

Figure 1:
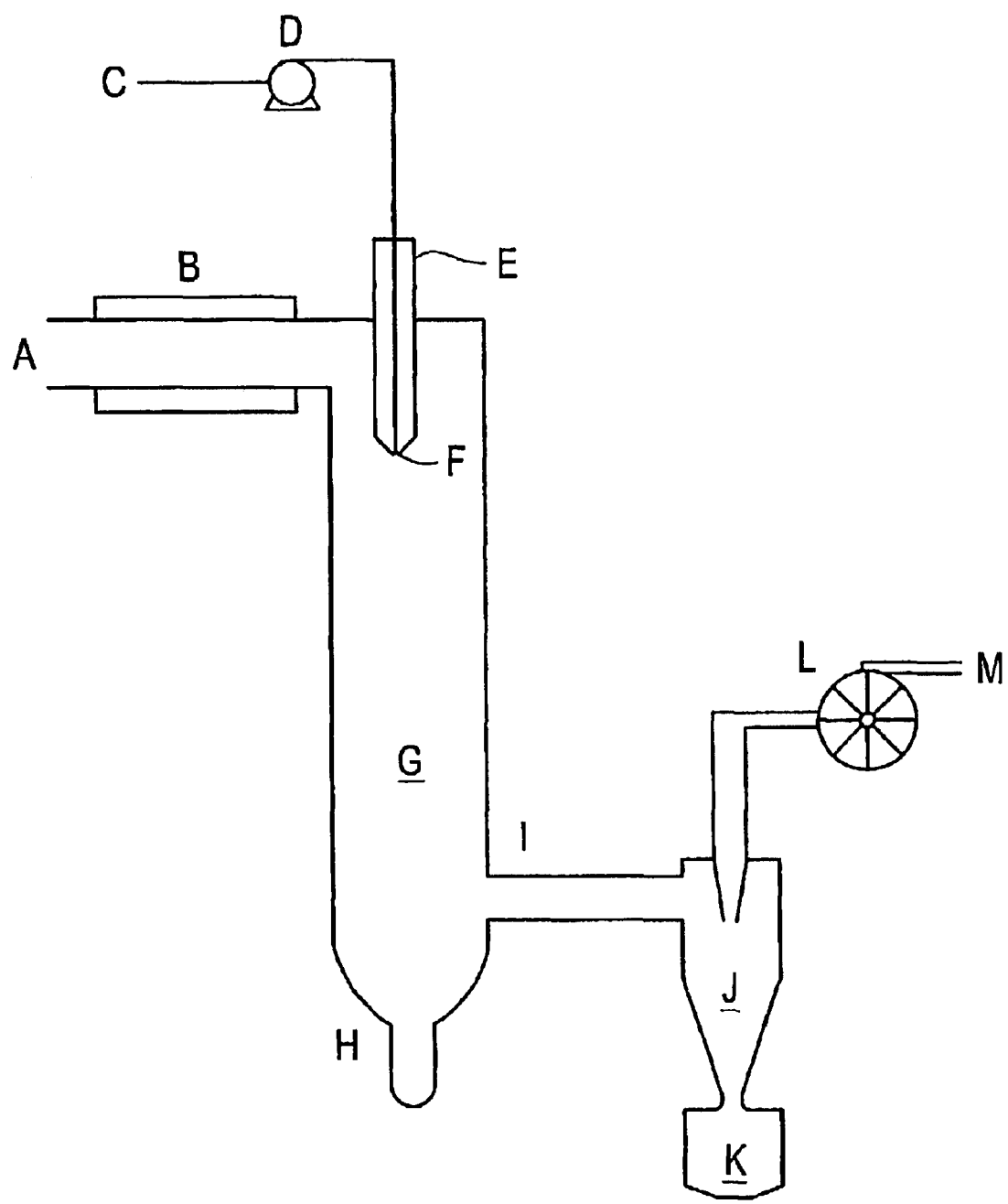
FIG. 1 is a schematic representation of a spray-drying apparatus suitable for use herein.

The expression "copolymer" (and other terms incorporating this root), as used herein, refers to polymers formed from the polymerization of two or more comonomers. The term "metallocene" refers to organometallic compounds containing one or more carbocyclic aromatic or dienyl ligands that are bound to the metal by means of delocalized π-electrons. The term "functional group" as used herein refers to a polyatomic ligand containing reactive functionality, or such a group capable of conversion to such a reactive group. Examples include, hydroxy, hydroxyhydrocarbyl, trihydrocarbylsilyloxy, trihydrocarbylsilyloxyhydrocarbyl, organometaloxy, organometaloxyhydrocarbyl, ester, ether, ketone, carboxylic acid, and sulfonic acid containing groups. The term "substituted" as used herein refers to any ligand or group wherein one or more hydrogens thereof is replaced by a halogen-, hydrocarbyl-, hydrocarbyloxy-, hydrocarbyloxyhydrocarbyl-, dihydrocarbylamino-, dihydrocarbylaminohydrocarbyl-, or hydrocarbyleneamino- substituent of up to 50 atoms not counting hydrogen, or two or more hydrogens thereof are replaced by a divalent derivative of the foregoing substituents.

The expression "catalyst" or "catalyst compound" as used herein refers to organometal compounds that are useful in catalyzing the polymerization of addition polymerizable monomers, generally in combination with one or more cocatalyst or activator compounds. Preferred catalyst compounds include non-metallocene compounds, such as those that are disclosed in U.S. Pat. No. 6,103,657, WO 98/30609, U.S. Pat. Nos. 5,866,663, 6,261,695, WO 99/46302, U.S. Pat. Nos. 6,127,497, 6,194,341 and 6,136,743.

More specifically, U.S. Pat. No. 6,103,657 discloses catalysts for polymerization of olefins having the formula:

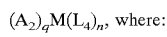

$(A_2)_q M(L_4)_n$, where:

each $A_2$ is a bidentate ligand group corresponding to formula (Ia):

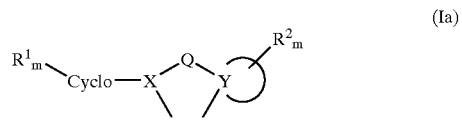

M is a metal selected from Groups 3–13 or the Lanthanides, preferably a Group 4 metal, most preferably Zr;

each $L_4$ is a monovalent, bivalent or trivalent anion, preferably selected from hydrogen, the halogens, $C_{1-50}$ alkyl, $C_{1-50}$ aryl, $C_{1-50}$ alkenyl, $C_{1-50}$ alkylaryl, $C_{1-50}$ arylalkyl, $C_{1-50}$ hydrocarboxy, $C_{1-50}$ amide, $C_{1-50}$ phosphide, $C_{1-50}$ sulfide, $C_{1-50}$ silylalkyl, $C_{1-50}$ diketonate and $C_{1-50}$ carboxylate;

q is 1 or 2, and when q is 2, the $A_2$ groups as defined above may be joined by a bridging group Z, bridging group Z preferably containing at least one atom selected from Groups 13, 14, 15 or 16 of the Periodic Table of the Elements;

n is an integer from 1 to 4;

each $R^1$ independently contains 1–50 atoms and is selected from among hydrogen, groups containing one or more atoms selected from Group 13–17 of the Periodic Table of the Elements, and optionally 2 or more adjacent $R^1$ groups may be joined to form a cyclic moiety (such a cyclic moiety preferably being selected from aliphatic rings or aromatic rings), preferred $R^1$ groups being alkyl groups, for example, isopropyl;

each $R^2$ independently contains 1–50 atoms and is selected from among hydrogen and groups containing one or more atoms selected from Group 13–17 of the Periodic Table of the Elements, preferred $R^2$ groups being hydrogen or aryl;

Q is a bridging group, preferably containing at least one Group 13–Group 16 element, preferred Q groups being substituted C;

each m is independently an integer from 0 to 5;

X and Y are independently non-carbon atoms, that is heteroatoms, Y being contained in a heterocyclic ring (which may contain additional heteroatoms) containing 2 to 7 C atoms, X and Y preferably being selected from among N, O, S and P; and Cyclo is a cyclic moiety, preferably a $C_{3-7}$ carbocyclic ring.

Catalyst compounds that are especially preferred for use in accordance with the present invention include the following compounds 1 and 2

Compound 1

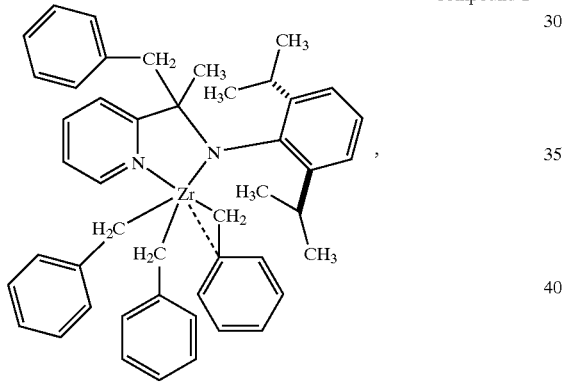

Compound 2

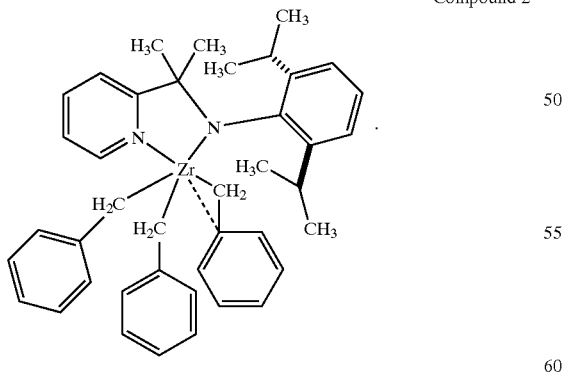

Additional catalyst compounds that are preferred for use in forming catalyst compositions according to the present invention include non-metallocene catalysts disclosed in WO 98/30609. Examples include compounds of the formulas I, II, III, IV, V, VI, XVIII, XXVII, XXXVII, XXXVIII, XXXIX and XXXX:

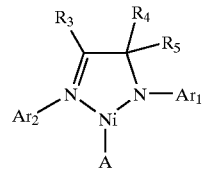

(I),

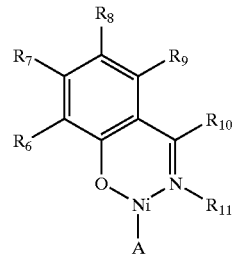

(II)

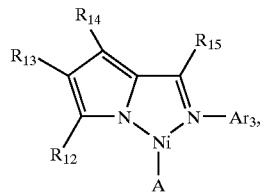

(III)

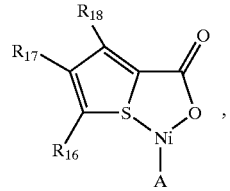

(IV)

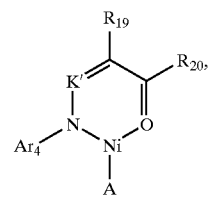

(V)

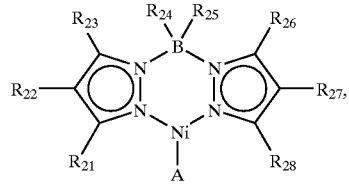

(VI)

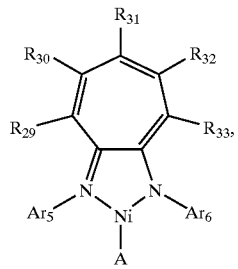

(XVIII)

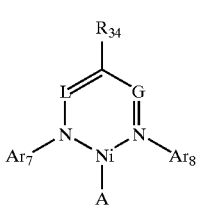
(XXVII)

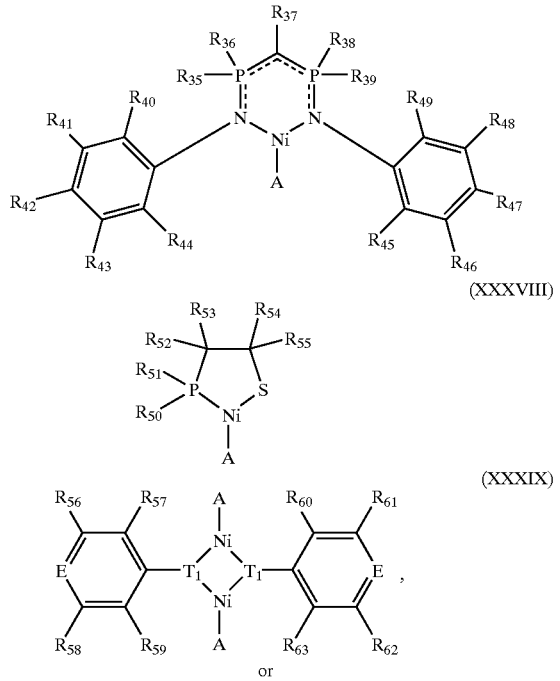
(XXXVII)

(XXXVIII)

(XXXIX)

or (XXXX)

wherein:

$Ar_1$, $Ar_2$, $Ar_3$, $Ar_4$, $Ar_5$, $Ar_6$, $Ar_7$ and $Ar_8$ are each independently aryl or substituted aryl;

$R_3$ and $R_4$ are each independently hydrogen, hydrocarbyl, substituted hydrocarbyl, or $R_3$ and $R_4$ taken together form a ring, and $R_5$ is hydrogen, hydrocarbyl or substituted hydrocarbyl, or $R_3$, $R_4$ and $R_5$ together form a ring;

A is a π-allyl or π-benzyl group, or a neutral or anionic, monodentate or bidentate ligand capable of being displaced by an olefin reactant under polymerization conditions;

$R^{10}$ and $R^{15}$ are each independently hydrogen, hydrocarbyl, or substituted hydrocarbyl;

$R_6$, $R_7$, $R_8$, $R_9$, $R_{12}$, $R_{13}$, $R_{14}$, $R_{16}$, $R_{17}$, $R_{18}$, $R_{21}$, $R_{22}$, $R_{23}$, $R_{26}$, $R_{27}$, $R_{28}$, $R_{29}$, $R_{30}$, $R_{31}$, $R_{32}$ and $R_{33}$ are each independently hydrogen, hydrocarbyl, substituted hydrocarbyl, or a functional group, and optionally two or more of such groups taken together may form a ring;

K' is N or $CR_{99}$;

$R_{20}$ is hydrocarbyl, substituted hydrocarbyl, $-SR_{100}$, $-OR_{100}$, or $-N(R_{101})_2$, $R_{19}$ is hydrogen, a functional group, hydrocarbyl or substituted hydrocarbyl, and $R_{99}$ is hydrocarbyl or substituted hydrocarbyl, and optionally $R_{19}$ and $R_{20}$ or $R_{19}$ and $R_{99}$ taken together may form a ring;

$R_{100}$ is hydrocarbyl or substituted hydrocarbyl;

each $R_{101}$ is independently hydrogen, hydrocarbyl or substituted hydrocarbyl;

G and L are both N or G is $CR_{102}$ and L is $CR_{103}$;

$R_{103}$, $R_{34}$ and $R_{102}$ are each independently hydrogen, hydrocarbyl or substituted hydrocarbyl, or any two of $R_{103}$, $R_{34}$ and $R_{102}$ taken together form a ring;

$R_{11}$ is hydrocarbyl or substituted hydrocarbyl;

$R_{37}$, $R_{40}$, $R_{41}$, $R_{42}$, $R_{43}$, $R_{44}$, $R_{45}$, $R_{46}$, $R_{47}$, $R_{48}$ and $R_{49}$ are each independently hydrogen, hydrocarbyl, substituted hydrocarbyl, or a functional group;

$R_{35}$, $R_{36}$, $R_{38}$ and $R_{39}$ are each independently hydrocarbyl or substituted hydrocarbyl;

$R_{50}$ and $R_{51}$ are each independently hydrocarbyl or substituted hydrocarbyl;

$R_{52}$, $R_{53}$, $R_{54}$ and $R_{55}$ are each independently hydrogen, hydrocarbyl, substituted hydrocarbyl or a functional group;

$T_1$ independently each occurrence is S or NH;

each E is N or $CR_{104}$ wherein $R_{104}$ is hydrogen, hydrocarbyl, substituted hydrocarbyl or a functional group;

$R_{56}$, $R_{57}$, $R_{58}$, $R_{59}$, $R_{60}$, $R_{61}$, $R_{62}$ and $R_{63}$ are each independently hydrogen, hydrocarbyl, substituted hydrocarbyl, or a functional group;

$R_{64}$, $R_{65}$, $R_{66}$, $R_{67}$, $R_{68}$, $R_{69}$, $R_{70}$ and $R_{71}$ are each independently hydrogen, hydrocarbyl, substituted hydrocarbyl or a functional group;

s is an integer of 1 or more; and $R_{24}$ and $R_{25}$ are each independently hydrogen, hydrocarbyl or substituted hydrocarbyl.

Catalyst compounds that are especially preferred in accordance with the present invention include compounds having the formula:

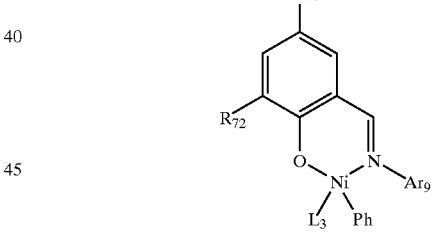

in which $L_3$ is a monovalent, divalent or trivalent anionic ligand, preferably selected from hydride, halide, $C_{1-50}$ alkyl, $C_{1-50}$ aryl, $C_{1-50}$ alkenyl, $C_{1-50}$ alkylaryl, $C_{1-50}$ arylalkyl, $C_{1-50}$ hydrocarbyloxy, $C_{1-50}$ dihydrocarbylamide, $C_{1-50}$ hydrocarbyleneamide $C_{1-50}$ phosphide, $C_{1-50}$ hydrocarbylsulfide, $C_{1-50}$ trihydrocarbylsilyl, $C_{1-50}$ trihydrocarbylsilylhydrocarbyl, $C_{1-50}$ diketonate and $C_{1-50}$ carboxylate;

$Ar_9$ is aryl or an aryl group substituted with one or more hydrocarbyl, hydrocarbyloxy, or hydrocarbyloxyhydrocarbyl groups, said $Ar_9$ containing up to 50 atoms, not counting hydrogen;

Ph is a phenyl group: and $R_{72}$ and $R_{73}$ are each independently hydrogen, hydrocarbyl, hydrocarbyl further substituted with one or more groups selected from the group consisting of hydrocarbyl, hydrocarbyloxy, and hydrocarbyloxyhydrocarbyl groups, or a functional group.

Compounds which are particularly preferred for use in accordance with the present invention include those having the formula:

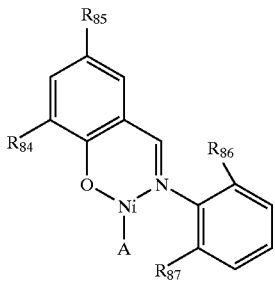

where A is a π-allyl or π-benzyl group; and $R_{84}$, $R_{85}$, $R_{86}$ and $R_{87}$ are each independently selected from among $C_{1-10}$ alkyl groups, preferably isopropyl.

Catalyst compounds disclosed in U.S. Pat. No. 5,866,663 that are especially preferred for use in accordance with the present invention include compounds of the formula:

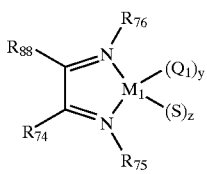

wherein:

$M_1$ is Ti, Zr, Sc, V, Cr, a rare earth metal, Fe, Co, Ni or Pd, in an oxidation state j;

y+z=j;

$R_{75}$ and $R_{76}$ are each independently hydrocarbyl or substituted hydrocarbyl, provided that the carbon atom of $R_{75}$ bound to the nitrogen atom is a secondary or tertiary carbon atom;

$R_{74}$ and $R_{88}$ are each independently hydrogen, hydrocarbyl, or substituted hydrocarbyl, or $R_{74}$ and $R_{88}$ taken together are a hydrocarbylene or substituted hydrocarbylene group forming a ring; and $Q_1$ and S' are each independently hydride, halide or $C_{1-20}$ alkyl.

Compounds which are especially preferred for use in accordance with the present invention include those having the formula:

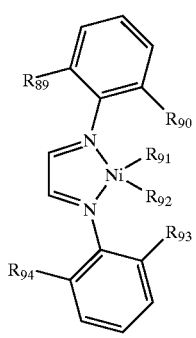

wherein $R_{89}$, $R_{90}$, $R_{93}$ and $R_{94}$ are each independently $C_{1-20}$ alkyl, preferably isopropyl, and $R_{91}$ and $R_{92}$ are each independently $C_{1-20}$ alkyl, preferably methyl.

Catalyst compounds disclosed in WO 99/46302 which are especially preferred for use in accordance with the present invention include compounds of the formula:

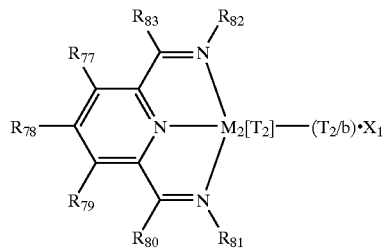

wherein:

$M_2$ is Fe[II], Fe[III], Co[I], Co[II], Co[III], Mn[I], Mn[II], Mn[III], Mn[IV], Ru[II], Ru[III], or Ru[IV];

$X_1$ is monoatomic or polyatomic ligand group or up to 50 atoms not counting hydrogen, bonded to $M_2$;

$T_2$ is the oxidation state of the transition metal $M_2$;

b is the valency of the monoatomic or polyatomic ligand group, $X_1$; and $R_{77}$, $R_{78}$, $R_{79}$, $R_{80}$, $R_{81}$, $R_{82}$ and $R_{83}$ are independently hydrogen, halogen, hydrocarbyl, or substituted hydrocarbyl, or two or more of $R_{77}$, $R_{78}$, $R_{79}$, $R_{80}$, $R_{81}$, $R_{82}$ and $R_{83}$ may be bound together, thereby forming one or more fused rings.

Additional catalyst compounds that are especially preferred for use in accordance with the present invention include those having the formula:

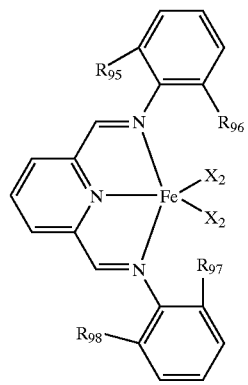

wherein $R_{95}$, $R_{96}$, $R_{97}$ and $R_{98}$ are each independently $C_{1-20}$ alkyl, preferably isopropyl; and each $X_2$ is a monoatomic or polyatomic ligand group of up to 50 atoms.

In a preferred embodiment of the invention, the catalyst compositions comprise one or more catalyst compounds which are non-metallocene, multi-dentate ligand containing compounds, preferably compounds which include at least one metallocyclic ring system.

The catalyst compositions of the present invention may include combinations of two or more catalyst compounds selected from the catalyst compounds described above, and/or may further include one or more catalyst compound outside the scope of those described above.

The catalyst activator for use herein can generally be any compound or composition which is effective for activating the catalyst compound for use in a polymerization. Suitable co-catalysts include linear or cyclic (co)oligomeric compounds having a formula selected from among (a), (b) and (c) set forth in this paragraph:

(a) $(M_{co-cat}R_{105}O)_t$, wherein $M_{co-cat}$ is a metal selected from among alkali metals, alkali earth metals, rare earth metals, aluminum and tin, aluminum being preferred, $R_{105}$ is hydride or a $C_{1-8}$ hydrocarbyl group, preferably methyl, ethyl or aryl (preferably substituted or unsubstituted phenyl or naphthyl), and t is an integer greater than or equal to 1;

(b) $(M_{co-cat}R_{106}O)_p$ $(M_{co-cat}R_{107}O)_r$, wherein $M_{co-cat}$ is as previously defined, $R_{106}$ and $R_{107}$ are each independently selected from among hydrogen and $C_{1-8}$ hydrocarbyl groups, and p and r are each independently an integer from 1 to 100; and (c) $M_{co-cat}R_{108}$, $M_{co-cat}R_{108}R_{109}$, $M_{co-cat}R_{108}R_{109}R_{110}$, or $M_{co-cat}R_{108}R_{109}R_{110}R_{111}$, wherein $M_{co-cat}$ is as previously defined, and $R_{108}$, $R_{109}$, $R_{110}$ and $R_{111}$, where present, are each independently selected from among hydride, $C_{1-8}$ hydrocarbyl and $C_1-C_8$ hydrocarbyloxy groups. Specific preferred examples of such co-catalysts include the aluminoxanes, in particular modified methylaluminoxane (MMAO) or methylaluminoxane (MAO). Other suitable co-catalysts include trimethyl aluminum (TMA) and triisobutyl aluminum (TIBA).

Co-catalysts as described above are known in the art, and can be prepared by those of ordinary skill in the art using any of a variety of known techniques. For instance, aluminoxanes may be prepared in a variety of ways. According to one method of preparing aluminoxanes, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyldialuminoxane containing $C_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing $C_2$ or higher alkyl groups with water to form a polyalkyl aluminoxane, which is then reacted with trimethylaluminum. Further modified methylaluminoxanes, which contain both methyl groups and higher alkyl groups, that is, isobutyl groups, may be synthesized by the reaction of a polyalkyl aluminoxane containing $C_2$ or higher alkyl groups with trimethylaluminum and then with water. Preparation of alumoxanes or modified alumoxanes is disclosed in U.S. Pat. Nos. 5,041,584, 5,527,752 and elsewhere.

Any solid material which is inert to the other components of the catalyst system and subsequent polymerization, can be employed as filler or support. Such materials can be organic or inorganic. Suitable fillers include silica, (including fumed silica), boron nitride, titanium dioxide, zinc oxide, polystyrene, and calcium carbonate. Fumed hydrophobic silica is preferred because it imparts high viscosity to the slurry and good strength to the spray-dried particles. The particulate material employed as a filler or support should have an average particle size no greater than 50 micrometers, preferably no greater than 10 micrometers. The particulate material employed as filler or support should be dry, that is, free of absorbed water. Sufficient filler is preferably employed to produce a slurry suitable for spray-drying, that is, a slurry containing such filler in an amount of from 0 percent by weight to 15 percent by weight, preferably from 2.5 percent by weight to 10 percent by weight, such that when spray-dried, the resulting droplets produce discrete catalyst particles. Desirably, the amount of filler or support present in the resulting catalyst particles is an amount of from 0 percent by weight to 50 percent by weight, preferably from 10 percent by weight to 30 percent by weight. The spray-dried catalyst particles produced in this manner typically have an average particle size of from 5–200 μm, preferably from 10–30 μm.

In accordance with the present invention, at least one diluent compound selected from among siloxanes, polyalkylene glycols, $C_{1-4}$ alkyl or phenyl ether or diether derivatives of polyalkylene glycols, and crown ethers is included in the catalyst compositions of the present invention. Spray-drying catalyst compositions according to the present invention results in spray-dried products which exhibit high degrees of uniformity of particle size and sphericity, that is, extremely useful morphology, and provide good activity. In addition, the present invention avoids problems caused by the tendency of alumoxane containing particles, when in a dried state, to form a glassy, brittle crystalline structure.

Preferred polyalkylene glycols include polyethylene glycol, containing from 2 to 5 alkyleneoxide repeat units. Siloxanes and crown ethers are particularly preferred diluents because they can provide improvements in particle morphology as well as increased activity in comparison to polymerization reactions conducted without the presence of such siloxane or crown ether compound. Preferred siloxanes include hexamethyldisiloxane, hexaethyldisiloxane and hexaphenyldisiloxane. Preferred crown ethers include 18-crown-6-ether and 15-crown-5-ether.

The diluent (siloxane, polyalkylene glycol, $C_{1-4}$ alkyl or phenyl ether or diether derivative of a polyalkylene glycol, or crown ether) is preferably present in the catalyst composition in an amount in the range of from 0.5 mole percent to 10 mole percent of the activating co-catalyst.

The amount of catalyst compound in the catalyst composition may vary over a wide range. Preferably, there is present from 0.01 mmol to 0.06 mmol, most preferably 0.03 mmol, of catalyst compound per gram of catalyst composition.

The activating cocatalyst is generally employed in a range based on moles of cocatalyst:moles of catalyst compound of from 2:1 to 100,000:1, preferably in the range of from 10:1 to 10,000:1, and most preferably in the range of from 50:1 to 1,000:1.

In formulating the catalyst composition, it is preferred that the co-catalyst, for example, alumoxane, be added to a slurry containing a solvent and filler or support, followed by adding the diluent additive and then stirring for a suitable period to form a uniform mixture, preferably at least 1 hour. Then, the catalyst compound is added and thoroughly mixed with the remaining ingredients to form the catalyst composition, which can then be sprayed and dried in accordance with the present invention.

Spray-drying may be effected by any spray-drying method known in the art. One example of a suitable spray-drying method comprises atomizing the catalyst composition optionally with heating, and drying the resulting droplets. Atomization is accomplished by means of any suitable atomizing device to form discrete droplets that upon drying form spherical or nearly spherical shaped particles. Atomization is preferably effected by passing the catalyst composition through the atomizing device together with an inert drying gas, that is, a gas which is nonreactive under the conditions employed during atomization and aids in removal of volatile components. An atomizing nozzle or a centrifugal high speed disc can be employed to effect atomization, whereby there is created a spray or dispersion of droplets of the mixture. The volumetric flow of drying gas, if used, preferably considerably exceeds the volumetric flow of the slurry to effect atomization of the slurry and/or evaporation of the liquid medium. Ordinarily the drying gas is heated to a temperature as high as 160° C. to facilitate atomization and drying of the slurry; however, if the volumetric flow of drying gas is maintained at a very high level, it is possible to employ lower temperatures. Atomization pressures of from 1–200 psig (100–1.4 MPa) are suitable. Some examples of suitable spray-drying methods include those disclosed in U.S. Pat. Nos. 5,290,745, 5,652,314, 4,376,062, 4,728,705, 5,604,172, 5,306,350 and 4,638,029.

FIG. 1 is a schematic representation of an example of an apparatus which is suitable for performing spray-drying in the present invention. Referring to FIG. 1, each mixture is drawn through tubing in operative communication with a reservoir attached at point C by a peristaltic pump D. As the mixture passes through nozzle F it is mixed with atomizing gas, such as nitrogen, which enters the atomizer at point E. The resulting mist of catalyst composition thus formed in the drying chamber G is then dried in the presence of a bath gas, preferably nitrogen, which enters the drying chamber at point A, after being first heated by heater B. Particles of unacceptably large diameter catalyst composition are not entrained in the bath gas flow and drop into oversize collection pot H. The remainder of the catalyst composition continues through chamber outlet I into the cyclone separator J, where the particulate catalyst composition is disengaged from the gas stream and dropped into a removable product collection pot K, from which the dried catalyst composition is recovered. The drying gas and bath gas are drawn through the aspirator L and removed from the system at point M.

Another type of suitable spray-drying method comprises forming a liquid mixture comprising a nonvolatile materials fraction, a solvent fraction and at least one compressed fluid; and spraying the liquid mixture at a temperature and pressure that gives a substantially decompressive spray by passing the mixture through an orifice into an environment suitable for forming solid particulates by solvent evaporation. For example, such a method is disclosed in U.S. Pat. No. 5,716,558.

By adjusting the size of the orifices of the atomizer employed during spray-drying, it is possible to obtain particles having desired average particle size, for example, from 5–200 μm.

The catalyst composition may be used for any reaction for which the catalyst is useful, preferred catalysts according to the present invention include catalysts for polymerization of olefins. Such reactions can be carried out by any suspension, solution, slurry, or gas phase process, using known equipment and reaction conditions, and is not limited to any specific type of reaction system. Such polymerization can be conducted in a batchwise mode, a continuous mode, or any combination thereof. Generally, suitable olefin polymerization temperatures are in the range of from 0–200° C. at atmospheric, subatmospheric, or superatmospheric pressures. It is generally preferred to use the catalyst compositions in polymerizations at concentrations sufficient to provide at least 0.000001, preferably 0.00001 percent, by weight, of transition metal based on the weight of the monomers to be polymerized. The upper limit of the percentages is determined by a combination of catalyst activity and process economics.

Preferably, gas phase polymerization is employed, at superatmospheric pressure in the range of from 1–1000 psi (7 kPa–7 MPa) at temperatures in the range of from 30–130° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions sufficient to polymerize the monomer(s) and in the presence of an effective amount of catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,543,399, 4,588,790, 5,352,749 and 5,462,999, and recycled to the reactor. Product is withdrawn from the reactor and make-up monomer is added to the recycle stream. In addition, a fluidization aid such as carbon black, silica, clay, or talc may be used, as disclosed in U.S. Pat. No. 4,994,534. Suitable gas phase reaction systems are also described in U.S. Pat. No. 5,527,752.

Slurry or solution polymerization processes may utilize subatmospheric or superatmospheric pressures and temperatures in the range of from 40–110° C. Useful liquid phase polymerization reaction systems are known in the art, for example, as described in U.S. Pat. Nos. 3,324,095, 5,453,471, 5,527,752, 5,834,571, WO 96/04322 and WO 96/04323. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, and toluene. Reactive contact between the olefin monomer and the catalyst composition should be maintained by constant stirring or agitation. Preferably, reaction medium containing the olefin polymer product and unreacted olefin monomer is withdrawn continuously from the reactor. Olefin polymer product is separated, and unreacted olefin monomer is recycled into the reactor.

EXAMPLES

It is understood that the present invention is operable in the absence of any component which has not been specifically disclosed. The following examples are provided in order to further illustrate the invention and are not to be construed as limiting. Unless stated to the contrary, all parts and percentages are expressed on a weight basis. The term "overnight", if used, refers to a time of approximately 16–18 hours, "room temperature", if used, refers to a temperature of about 20–25° C. All syntheses and manipulations of air-sensitive materials were carried out in an inert atmosphere (nitrogen or argon) glove box.

Example 1

Figure 2:
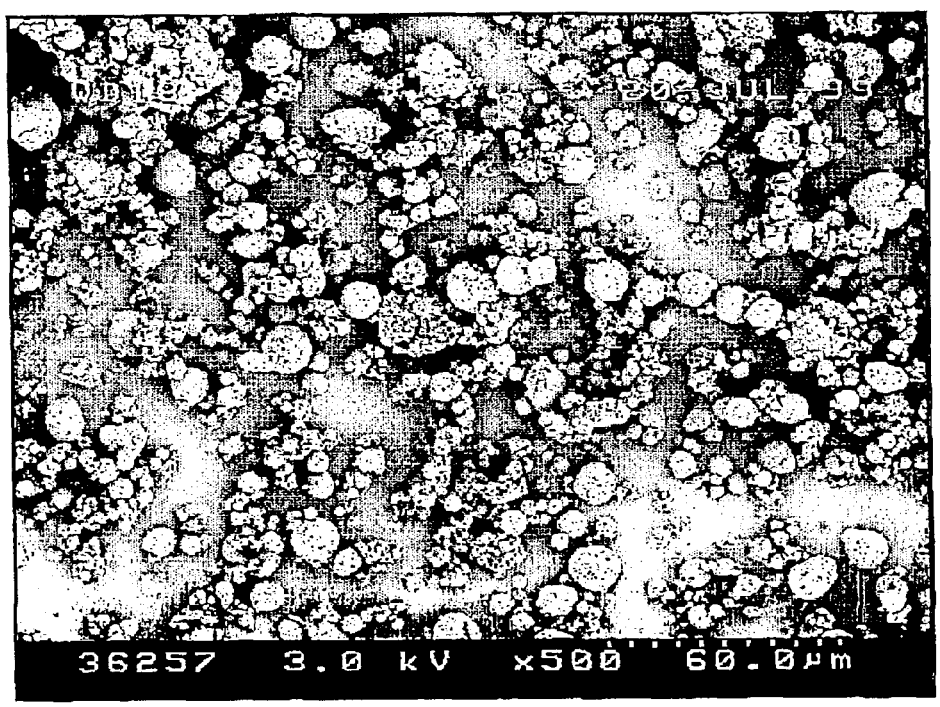
FIG. 2 is a scanning electron micrograph (SEM) of a product formed according to the present invention, as described in Example 1.

A glass bottle was charged with 2.15 g of predried fumed silica (Cabosil TS-610, available from Cabot Inc.), and 20 mL toluene. To this was added a solution containing 24.1 g MAO/toluene solution (20 percent) and 4.85 g hexaphenyldisiloxane diluent compound which had been stirred for 1 hour. Finally, 250 mg [N-(2,6-diisopropylphenyl)(1-phenyl-2-(N-pyridylpropane-2-yl)amido]zirconium tribenzyl (prepared by reaction of 2-acetylpyridine [2,6-diisopropylphenylimine] with zirconium tetrabenzyl according to the teachings of WO-99/01460) was added to the slurry and the mixture was passed through a spray dryer (Model 190 Mini Spray-dryer, available from Buchi Corporation) to form a spray dried product of substantially uniform, spherical, particles. Yield was 9 g of a pale yellow solid containing 0.26 weight percent Zr and 12.7 weight percent Al. FIG. 2 is a scanning electron micrograph (SEM) of the product obtained. As can be seen by comparison of this SEM with FIG. 3, (an SEM of Comparative A, a comparative test in which none of the additives according to the present invention were employed), the present invention achieved improved uniformity and sphericity.

Example 2

A glass bottle was charged with 2.98 g of of predried fumed silica (Cabosil TS-610, available from Cabot Inc.) and 50 mL toluene. To this was added a solution containing 12.05 g MAO/toluene solution (20 percent) and 2.5 g 18-crown-6 which had been stirred for 1 hour. Finally, 125 mg of [N-(2,6-diisopropylphenyl)(1-phenyl-2-(N-pyridylpropane-2-yl)amido]zirconium tribenzyl was added to the slurry and the mixture was passed through a spray dryer (Model 190 Mini Spray-dryer, available from Buchi Corporation) to form a spray dried product of substantially uniform, spherical, particles. Yield was 5 g of a pale yellow solid containing 0.26 weight percent Zr and 14.7 weight percent Al.

Example 3

In a glove box, a glass bottle was charged with 4.98 g of predried filmed silica (Cabosil TS-610, available from Cabot Inc.), and 100 mL toluene. To this was added a solution containing 12.05 g MAO/toluene solution (20 percent) and 2.5 g polydimethyldisiloxane which had been stirred for 1 hour. Finally, 125 mg of [N-(2,6-diisopropylphenyl)(1-phenyl-2-(N-pyridylpropane-2-yl)amido]zirconium tribenzyl was added to the slurry and the mixture was passed through a spray dryer (Model 190 Mini Spray-dryer, available from Buchi Corporation) to form a spray dried product of substantially uniform, spherical, particles. Yield was 7 g of a pale yellow solid containing 0.24 weight percent Zr and 8.68 weight percent Al.

Polymerization

A 1 liter stirred autoclave reactor was charged with 450 cc hexane, 50 cc 1-hexene, triisobutylaluminum (TiBA) in an amount sufficient to provide about 1000:1 molar ratio based on Zr, and sufficient catalyst/ mineral oil slurry to give a charge of from 0.5–1.0 micromoles of the catalysts prepared in Examples 1–3. The reactor was charged with 1-hexene and the temperature was raised to 60 degrees C. Ethylene was fed to maintain a desired reactor pressure, the catalyst was charged by pressure injection and the temperature was controlled to 75° C. After reaction times from 10 to 30 minutes, ethylene feed was stopped, the reactor was cooled and vented, and granular polyethylene in commercially suitable quantity and quality was recovered.

Comparative A

Figure 3:
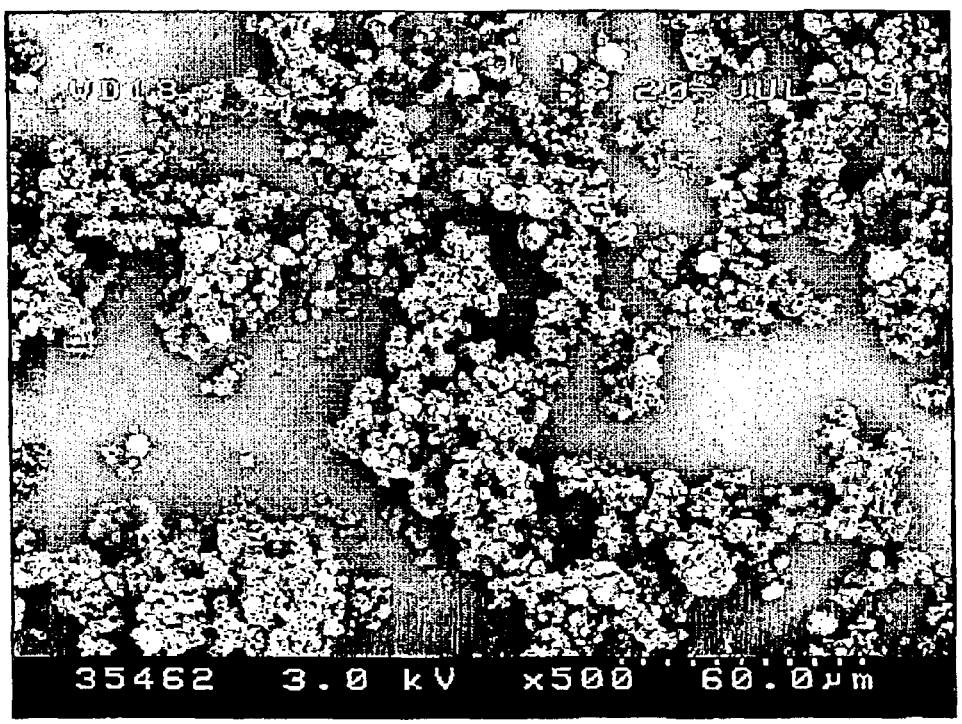
FIG. 3 is an SEM of a comparative product, formed as described in Comparative A.

The reaction conditions of Example 1 were substantially repeated excepting that no diluent compound was added to the mixture. The resulting slurry passed through a spray dryer (Model 190 Mini Spray-dryer, available from Buchi Corporation) to form a spray dried product. Yield was 3 g of a pale yellow solid. FIG. 3 is an SEM of the resulting product.

What is claimed is:

1. A method of spray-drying a catalyst composition comprising forming a spray by passing a catalyst composition, an inert hydrocarbon solvent, and at least one inert drying gas through an atomizer comprising an atomizing nozzle or a centrifugal high speed disc, and drying the resulting spray, characterized in that the catalyst composition comprises a catalyst compound, an activator for said catalyst compound and at least one compound selected from among siloxanes, polyalkylene glycols, $C_{1-4}$ alkyl or phenyl ether or diether derivatives of polyalkylene glycols, and crown ethers.

2. The method of claim 1, wherein said catalyst composition further comprises at least one filler.

3. The method of claim 1, wherein said catalyst compound is selected from among:

i) compounds having the formula $(A_2)_q M(L_4)_n$, where:

each $A_2$ is a bidentate ligand group corresponding to formula (Ia):

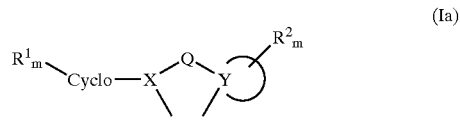

(Ia)

M is a metal selected from Groups 3–13 of the Periodic Table of the Elements or the Lanthanides;

each $L_4$ is a monovalent, bivalent or trivalent anion, selected from the group consisting of hydrogen, halogen, $C_{1-50}$ alkyl, $C_{1-50}$ aryl, $C_{1-50}$ alkenyl, $C_{1-50}$ alkylaryl, $C_{1-50}$ arylalkyl, $C_{1-50}$ hydrocarboxy, $C_{1-50}$ amide, $C_{1-50}$ phosphide, $C_{1-50}$ sulfide, $C_{1-50}$ silylalkyl, $C_{1-50}$ diketonate and $C_{1-50}$ carboxylate;

q is 1 or 2, and when q is 2, the $A_2$ groups as defined above may be joined by a bridging group Z, said bridging group Z containing at least one atom selected from Groups 13, 14, 15 or 16 of the Periodic Table of the Elements;

n is an integer from 1 to 4;

each $R^1$ independently contains 1–50 atoms and is hydrogen or a group containing one or more atoms selected from Group 13–17 of the Periodic Table of the Elements, and optionally 2 or more adjacent $R^1$ groups may be joined to form a cyclic moiety;

each $R^2$ independently contains 1–50 atoms and is hydrogen or a group containing one or more atoms selected from Group 13–17 of the Periodic Table of the Elements;

Q is a bridging group;

each m is independently an integer from 0 to 5;

X and Y are independently non-carbon atoms, Y being contained in a heterocyclic ring which may contain additional heteroatoms containing 2 to 7 C atoms; and Cyclo is a cyclic moiety;

ii) compounds having one of the following formulas, or dimers thereof:

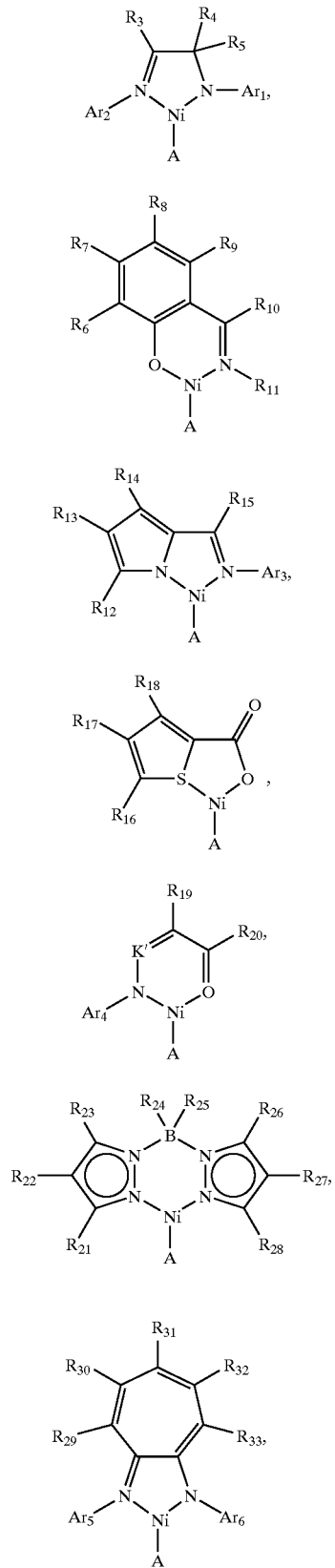

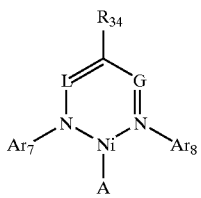

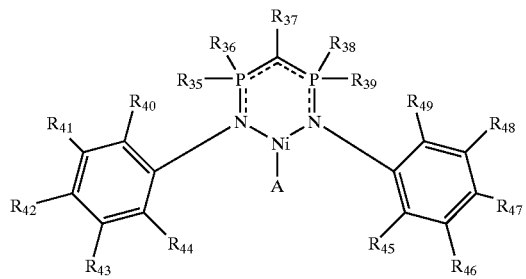

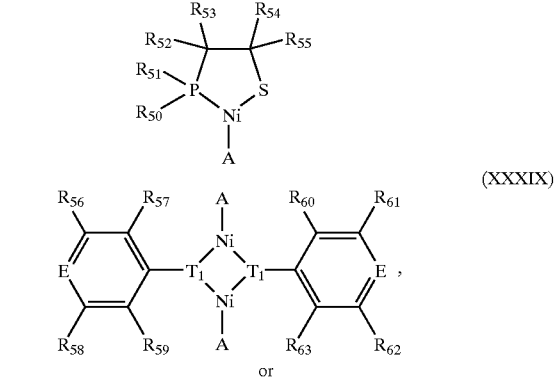

wherein:

Ar₁, Ar₂, Ar₃, Ar₄, Ar₅, Ar₆, Ar₇ and Ar₈ are each independently aryl or substituted aryl;

$R_3$ and $R_4$ are each independently hydrogen, hydrocarbyl, substituted hydrocarbyl, or $R_3$ and $R_4$ taken together form a ring, and $R_5$ is hydrogen, hydrocarbyl or substituted hydrocarbyl, or $R_3$, $R_4$ and $R_5$ together form a ring;

A is a π-allyl or π-benzyl group, or a neutral or anionic, monodentate or bidentate ligand capable of being displaced by an olefin reactant under polymerization conditions;

$R^{10}$ and $R^{15}$ are each independently hydrogen, hydrocarbyl, or substituted hydrocarbyl;

$R_6$, $R_7$, $R_8$, $R_9$, $R_{12}$, $R_{13}$, $R_{14}$, $R_{16}$, $R_{17}$, $R_{18}$, $R_{21}$, $R_{22}$, $R_{23}$, $R_{26}$, $R_{27}$, $R_{28}$, $R_{29}$, $R_{30}$, $R_{31}$, $R_{32}$ and $R_{33}$ are each independently hydrogen, hydrocarbyl, substituted hydrocarbyl, or a functional group, and optionally two or more of such groups taken together may form a ring;

K' is N or $CR_{99}$;

$R_{20}$ is hydrocarbyl, substituted hydrocarbyl, $-SR_{100}$, $-OR_{100}$, or $-N(R_{101})_2$, $R_{19}$ is hydrogen, a functional group, hydrocarbyl or substituted hydrocarbyl, and $R_{99}$ is hydrocarbyl or substituted hydrocarbyl, and optionally $R_{19}$ and $R_{20}$ or $R_{19}$ and $R_{99}$ taken together may form a ring;

$R_{100}$ is hydrocarbyl or substituted hydrocarbyl;

each $R_{101}$ is independently hydrogen, hydrocarbyl or substituted hydrocarbyl;

G and L are both N or G is $CR_{102}$ and L is $CR_{103}$;

$R_{103}$, $R_{34}$ and $R_{102}$ are each independently hydrogen, hydrocarbyl or substituted hydrocarbyl, or any two of $R_{103}$, $R_{34}$ and $R_{102}$ taken together form a ring;

$R_{11}$ is hydrocarbyl or substituted hydrocarbyl;

$R_{37}$, $R_{40}$, $R_{41}$, $R_{42}$, $R_{43}$, $R_{44}$, $R_{45}$, $R_{46}$, $R_{47}$, $R_{48}$ and $R_{49}$ are each independently hydrogen, hydrocarbyl, substituted hydrocarbyl, or a functional group;

$R_{35}$, $R_{36}$, $R_{38}$ and $R_{39}$ are each independently hydrocarbyl or substituted hydrocarbyl;

$R_{50}$ and $R_{51}$ are each independently hydrocarbyl or substituted hydrocarbyl;

$R_{52}$, $R_{53}$, $R_{54}$ and $R_{55}$ are each independently hydrogen, hydrocarbyl, substituted hydrocarbyl or a functional group;

$T_1$ independently each occurrence is S or NH;

each E is N or $CR_{104}$ wherein $R_{104}$ is hydrogen, hydrocarbyl, substituted hydrocarbyl or a functional group;

$R_{56}$, $R_{57}$, $R_{58}$, $R_{59}$, $R_{60}$, $R_{61}$, $R_{62}$ and $R_{63}$ are each independently hydrogen, hydrocarbyl, substituted hydrocarbyl, or a functional group;

$R_{64}$, $R_{65}$, $R_{66}$, $R_{67}$, $R_{68}$, $R_{69}$, $R_{70}$ and $R_{71}$ are each independently hydrogen, hydrocarbyl, substituted hydrocarbyl or a functional group;

s is an integer of 1 or more; and $R_{24}$ and $R_{25}$ are each independently hydrogen, hydrocarbyl or substituted hydrocarbyl iii) compounds having the formula:

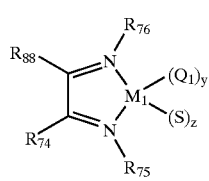

wherein:

$M_1$ is Ti, Zr, Sc, V, Cr, a rare earth metal, Fe, Co, Ni or Pd, in an oxidation state j;

y+z=j;

$R_{75}$ and $R_{76}$ are each independently hydrocarbyl or substituted hydrocarbyl, provided that the carbon atom of $R_{75}$ bound to the nitrogen atom is a secondary or tertiary carbon atom;

$R_{74}$ and $R_{88}$ are each independently hydrogen, hydrocarbyl, or substituted hydrocarbyl, or $R_{74}$ and $R_{88}$ taken together are a hydrocarbylene or substituted hyrdocarbylene group forming a ring; and $Q_1$ and S' are each independently hydride, halide or $C_{1-20}$ alkyl; and iv) compounds having the formula:

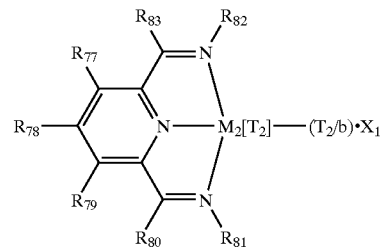

wherein:

$M_2$ is Fe[II], Fe[III], Co[I], Co[II], Co[III], Mn[I], Mn[II], Mn[III], Mn[IV], Ru[II], Ru[III], or Ru[IV];

$X_1$ is monoatomic or polyatomic ligand group or up to 50 atoms not counting hydrogen, bonded to $M_2$;

$T_2$ is the oxidation state of the transition metal $M_2$;

b is the valency of the monoatomic or polyatomic ligand group, $X_1$; and $R_{77}$, $R_{78}$, $R_{79}$, $R_{80}$, $R_{81}$, $R_{82}$ and $R_{83}$ are independently hydrogen, halogen, hydrocarbyl, or substituted hydrocarbyl, or two or more of $R_{77}$, $R_{78}$, $R_{79}$, $R_{80}$, $R_{81}$, $R_{82}$ and $R_{83}$ may be bound together, thereby forming one or more fused rings.

4. The method of claim 1, wherein said catalyst compound is selected from among

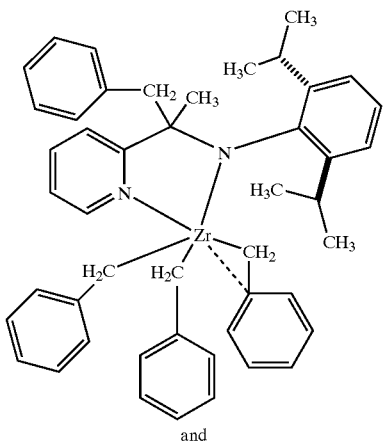

and

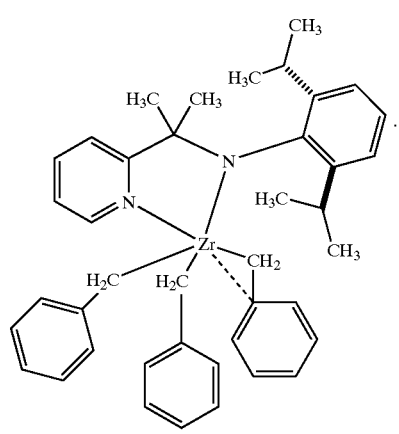

5. The method of claim 1, wherein said activator for said catalyst compound is methylalumoxane or modified methylalumoxane.

6. A composition comprising:

at least one multi-dentate complexing-metal-based catalyst compound;

an activator for said catalyst compound; and at least one compound selected from among siloxanes, polyalkylene glycols, $C_{1-4}$ alkyl or phenyl ether or diether derivatives of polyalkylene glycols, and crown ethers, wherein said at least one catalyst compound is selected from among:

i) compounds having the formula $(A_2)_q M(L_4)_n$, where:

each $A_2$ has a formula corresponding to formula (I):

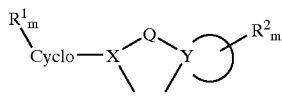

M is an element selected from among the elements in Group 3–Group 13 and Lanthanide elements;

each $L_4$ is a monovalent, bivalent or trivalent anion selected from hydrogen, the halogens, $C_{1-50}$ alkyl, $C_{1-50}$ aryl, $C_{1-50}$ alkenyl, $C_{1-50}$ alkylaryl, $C_{1-50}$ arylalkyl, $C_{1-50}$ hydrocarboxy, $C_{1-50}$ amide, $C_{1-50}$ phosphide, $C_{1-50}$ sulfide, $C_{1-50}$ silylalkyl, $C_{1-50}$ diketonate and $C_{1-50}$ carboxylate;

q is 1 or 2, and when q is 2, the $A_2$ groups as defined above are joined together or are joined by a bridging group Z, bridging group Z containing at least one Group IIIA, IVA, VA or VIA element;

n is an integer from 1 to 4;

each $R^1$ independently contains 1–50 atoms at least one of which is selected from among hydrogen, Group 13–Group 17 elements, and 2 or more adjacent $R^1$ groups are not joined or are joined to form a cyclic moiety;

each $R^2$ independently contains 1–50 atoms, at least one of which is selected from among hydrogen and Group 13–Group 17 elements;

Q is a bridging group containing at least one Group 13–Group 16 element;

each m is independently an integer from 0 to 5;

X and Y are independently heteroatoms, Y being contained in a heterocyclic ring, which does or does not contain additional heteroatoms, containing 2 to 7 C atoms, X and Y being selected from among N, O, S and P;

Cyclo is a cyclic moiety;

ii) compounds having one of the following formulas, or dimers thereof:

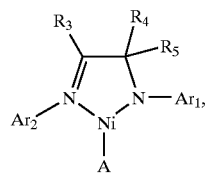
(I)

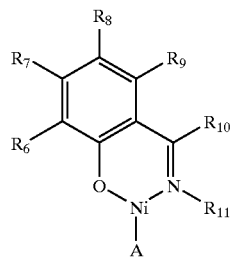
(II)

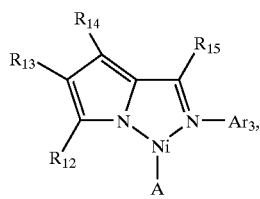
(III)

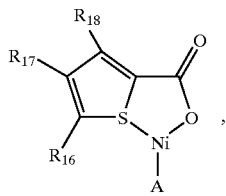
(IV)

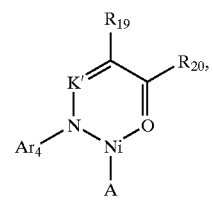
(V)

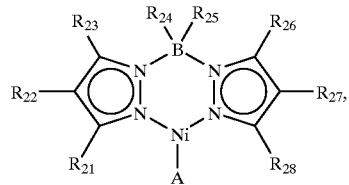
(VI)

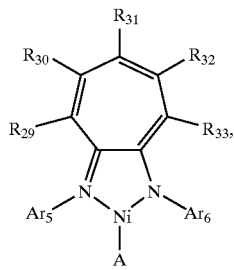
(XVIII)

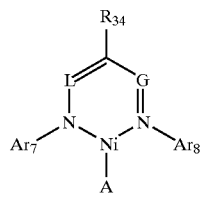
(XXVII)

-continued

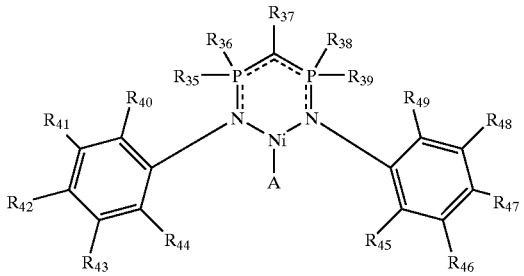

(XXXVII)

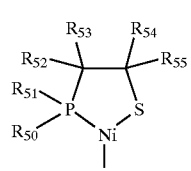

(XXXVIII)

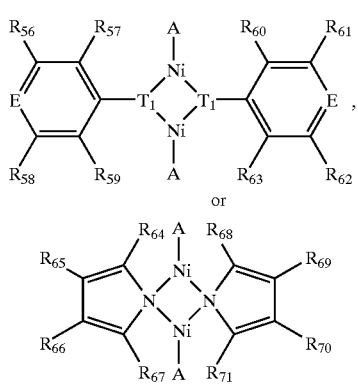

(XXXIX)

or

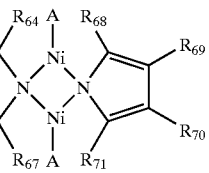

(XXXX)

wherein:
$Ar_1$, $Ar_2$, $Ar_3$, $Ar_4$, $Ar_5$, $Ar_6$, $Ar_7$ and $Ar_8$ are each independently aryl or substituted aryl;
$R_3$ and $R_4$ are each independently hydrogen, hydrocarbyl, substituted hydrocarbyl, or $R_3$ and $R_4$ taken together form a ring, and $R_5$ is hydrogen, hydrocarbyl or substituted hydrocarbyl, or $R_3$, $R_4$ and $R_5$ together form a ring;
A is a □-allyl or □-benzyl group, or a neutral or anionic, monodentate or bidentate ligand capable of being displaced by an olefin reactant under polymerization conditions;
$R^{10}$ and $R^{15}$ are each independently hydrogen, hydrocarbyl, or substituted hydrocarbyl;
$R_6$, $R_7$, $R_8$, $R_9$, $R_{12}$, $R_{13}$, $R_{14}$, $R_{16}$, $R_{17}$, $R_{18}$, $R_{21}$, $R_{22}$, $R_{23}$, $R_{26}$, $R_{27}$, $R_{28}$, $R_{29}$, $R_{30}$, $R_{31}$, $R_{32}$ and $R_{33}$ are each independently hydrogen, hydrocarbyl, substituted hydrocarbyl, or a functional group, and optionally two or more of such groups taken together may form a ring;
K' is N or $CR_{99}$;
$R_{20}$ is hydrocarbyl, substituted hydrocarbyl, —$SR_{100}$, —$OR_{100}$, or —$N(R_{101})_2$, $R_{19}$ is hydrogen, a functional group, hydrocarbyl or substituted hydrocarbyl, and $R_{99}$ is hydrocarbyl or substituted hydrocarbyl, and optionally $R_{19}$ and $R_{20}$ or $R_{19}$ and $R_{99}$ taken together form a ring;
$R_{100}$ is hydrocarbyl or substituted hydrocarbyl;
each $R_{101}$ is independently hydrogen, hydrocarbyl or substituted hydrocarbyl;
G and L are both N or G is $CR_{102}$ and L is $CR_{103}$;
$R_{103}$, $R_{34}$ and $R_{102}$ are each independently hydrogen, hydrocarbyl or substituted hydrocarbyl, or any two of $R_{103}$, $R_{34}$ and $R_{102}$ taken together form a ring;

$R_{11}$ is hydrocarbyl or substituted hydrocarbyl;
$R_{37}$, $R_{40}$, $R_{41}$, $R_{42}$, $R_{43}$, $R_{44}$, $R_{45}$, $R_{46}$, $R_{47}$, $R_{48}$ and $R_{49}$ are each independently hydrogen, hydrocarbyl, substituted hydrocarbyl, or a functional group;
$R_{35}$, $R_{36}$, $R_{38}$ and $R_{39}$ are each independently hydrocarbyl or substituted hydrocarbyl;
$R_{50}$ and $R_{51}$ are each independently hydrocarbyl or substituted hydrocarbyl;
$R_{52}$, $R_{53}$, $R_{54}$ and $R_{55}$ are each independently hydrogen, hydrocarbyl, substituted hydrocarbyl or a functional group;
$T_1$ independently each occurrence is S or NH;
each E is N or $CR_{104}$ wherein $R_{104}$ is hydrogen, hydrocarbyl, substituted hydrocarbyl or a functional group;
$R_{56}$, $R_{57}$, $R_{58}$, $R_{59}$, $R_{60}$, $R_{61}$, $R_{62}$ and $R_{63}$ are each independently hydrogen, hydrocarbyl, substituted hydrocarbyl, or a functional group;
$R_{64}$, $R_{65}$, $R_{66}$, $R_{67}$, $R_{68}$, $R_{69}$, $R_{70}$ and $R_{71}$ are each independently hydrogen, hydrocarbyl, substituted hydrocarbyl or a functional group;
s is an integer of 1 or more; and
$R_{24}$ and $R_{25}$ are each independently hydrogen, hydrocarbyl or substituted hydrocarbyl
iii) compounds having the formula:

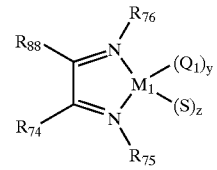

wherein:
$M_1$ is Ti, Zr, Sc, V, Cr, a rare earth metal, Fe, Co, Ni or Pd, in an oxidation state j;
y+z=j;
$R_{75}$ and $R_{76}$ are each independently hydrocarbyl or substituted hydrocarbyl, provided that the carbon atom of $R_{75}$ bound to the nitrogen atom is a secondary or tertiary carbon atom;
$R_{74}$ and $R_{88}$ are each independently hydrogen, hydrocarbyl, or substituted hydrocarbyl, or $R_{74}$ and $R_{88}$ taken together are a hydrocarbylene or substituted hyrdocarbylene group forming a ring; and
$Q_1$ and S' are each independently hydride, halide or $C_{1-20}$ alkyl; and
iv) compounds having the formula:

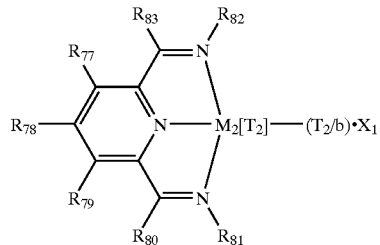

wherein:
$M_2$ is Fe[II], Fe[III], Co[I], Co[II], Co[III], Mn[I], Mn[II], Mn[III], Mn[IV], Ru[II], Ru[III], or Ru[IV];
$X_1$ is monoatomic or polyatomic ligand group or up to 50 atoms not counting hydrogen, bonded to $M_2$;
$T_2$ is the oxidation state of the transition metal $M_2$;
b is the valency of the monoatomic or polyatomic ligand group, $X_1$; and R$_{77}$, R$_{78}$, R$_{79}$, R$_{80}$, R$_{81}$, R$_{82}$ and R$_{83}$ are independently hydrogen, halogen, hydrocarbyl, or substituted hydrocarbyl, or two or more of R$_{77}$, R$_{78}$, R$_{79}$, R$_{80}$, R$_{81}$, R$_{82}$ and R$_{83}$ are bound together, thereby forming one or more fused rings.

7. The composition of claim 6, wherein said catalyst compound is selected from among

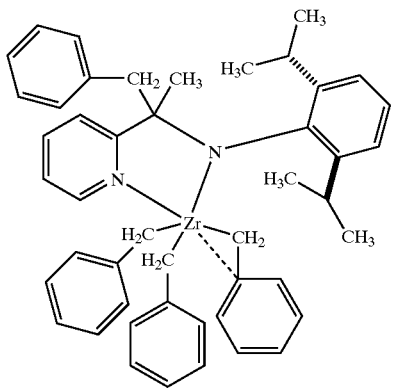

and

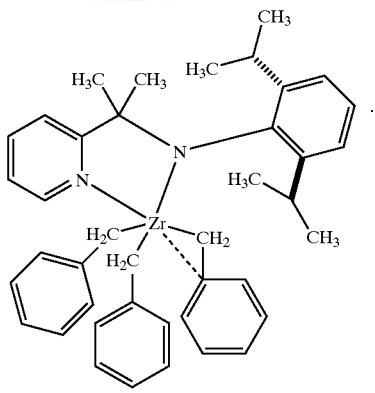

8. The composition of claim 6, further comprising a filler.

9. The composition of claim 6, wherein said activator for said catalyst compound is methylalumoxane or modified methylalumoxane.

* * * * *